May 30, 1967  J. SCHICK  3,322,475

BEARING BUSHING

Filed Jan. 13, 1964

INVENTOR.
Joachim Schick
BY

United States Patent Office 3,322,475
Patented May 30, 1967

3,322,475
BEARING BUSHING
Joachim Schick, Hannover, Germany, assignor to Continental Gummi-Werke Aktiengesellschaft, Hannover, Germany
Filed Jan. 13, 1964, Ser. No. 337,468
Claims priority, application Germany, Jan. 18, 1963, C 28,936
1 Claim. (Cl. 308—36.1)

The present invention relates to a bearing bushing of rubber elastic material which is provided with sliding surfaces having grooves for receiving a lubricant. While not limited to, the present invention is particularly useful in connection with motor vehicles.

It is an object of this invention to provide a bearing bushing of the above-mentioned general character which will be play-free and will easily guide the structural elements to be mounted therein.

It is another object of this invention to provide a bearing bushing as set forth in the preceding paragraph which will not be damaged by movement of the structural element received thereby.

These and other objects and advantages of the invention will appear more clearly from the following specification in connection with the accompanying drawings, in which.

A bearing bushing according to the present invention which is provided with the grooves arranged in the supporting surface thereof, for receiving a lubricant, is characterized primarily in that individual grooves, groups of grooves, or all of the grooves together with the surface of the sliding structural element form hollow, completely closed chambers. When the bearing is assembled, it is these hollow chambers into which the lubricant is filled whereby for the ordinary life of the bearing, a servicing of the bearing will be superfluous. The supply of lubricant will assure an easy movement of the journalled structural element, and the elastic material from which the bushing is made will reduce the transfer of oscillations and noises.

When the hollow chambers for the lubricant are formed by a greater number of individual grooves, it will be sufficient to end the axial grooves ahead of the end faces of the bushing. If, however, a single hollow chamber is provided so that the lubricant will be able also after a certain amount has been consumed, uniformly to distribute itself over the circumference of the journalled structrual element, the individual grooves may be in intercommunication with each other by transverse passages, which likewise may be in the form of grooves. In order to produce such bearing bushings and to provide for a considerable lubricant supply, it is advantageous to extend the grooves in axial direction up to the end faces of the bushing and to provide the bushing with an annular sealing strip which, while engaging the journalled structural element, will prevent the lubricant from escaping. By such an arrangement, an annular hollow chamber will be formed at both ends of the bushing and at the ends of the substantially axially extending grooves. This annular chamber will establish communication between the individual hollow chambers created by the grooves.

Figure 1:
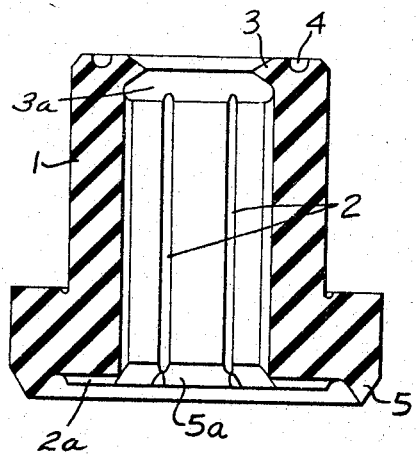
FIGURE 1 is a section through a bearing bushing according to the present invention.
Figure 2:
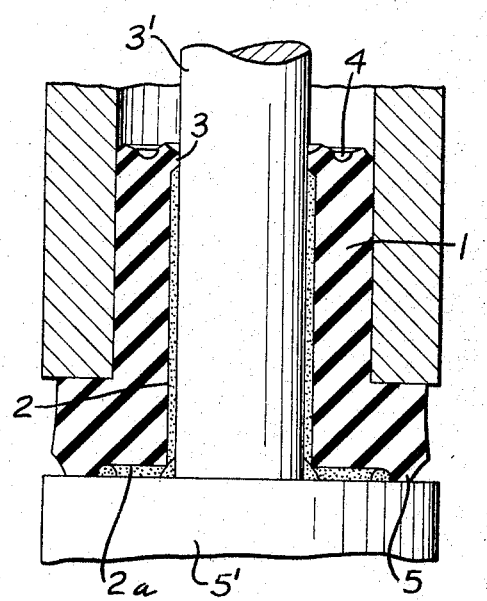
FIGURE 2 shows a bearing bushing according to FIGURE 1 in installed condition.

Referring now to the drawing in detail, the combined radial and axial bearing bushing 1 illustrated in FIGS. 1 and 2 has its sliding surface provided with grooves 2 extending in axial direction and communicating with radial grooves 2a and annular hollow chambers 3a, 5a being transverse passages. The axial extended bearing portion is closed at one end by a sealing strip 3 which is wedge-shaped and directed to the journalled member 3'. In order to prevent unused lubricant from escaping between the sealing strip 3 and the journalled member 3', the sealing strip is applied to the member 3' under load, so that the sealing effect will also be assured when the bearing bushing is unilaterally compressed by transverse forces and is lifted off the opposite side of the bushing wall. It is for the just-mentioned reason that the diameter at the inner edge of the sealing strip 3 is less than the inner diameter of the bushing so that when introducing the member 3', a pre-load will be created in the sealing strip 3 whereby an escape of lubricant will be prevented.

In order to aid the yieldability of the sealing strip 3, the end face of the bushing is provided with recesses 4. In this way, when the sealing strip 3 is radially displaced, the body of the bushing 1 will not be deformed by the sealing strip. Similarly, a sealing strip 5 is provided at the other end of the bushing and is adapted under pre-load to be pressed against a disc-shaped member 5'.

Correspondingly directed sealing strips are provided in connection with combined radial and axial bearings. More specifically, bearings of this type are provided on one hand with a radially directed and pre-loaded sealing strip and on the other hand, with an axially directed and pre-loaded sealing strip. If a radial bearing is combined at both ends with an axial bearing, it suffices for purposes of providing a closed hollow chamber for the lubricant, to arrange two axially directed sealing strips on the bearing bushing.

In this connection, it should be noted that in order to guide the journalled structural element in a play-free manner, the bushing is produced with a slight oversize so that when installing the bushing and the structural element, the latter will be held under pre-load. In order to assure that also under these conditions, the bearing will be easily movable, the total surface confined by the grooves is advantageously kept greater than the surface of the ribs between the grooves. The ribs will thus have the possibility to yield when the structural element is introduced into the bushing, so as to guide the journalled structural element under a slight pre-load. Expressed differently, the ribs should be able, when installing the bearing, slightly to deform themselves. The same effect may also be obtained when rather wide ribs are provided between the grooves, by making said ribs of a particularly yieldable material.

During installation of the bearing the internal surface should be provided with lubricant.

While rubber material has proved particularly useful for bushings of the type described above, also other materials such as polyurethane and polyvinyl chloride may be used for this purpose.

It is, of course, to be understood, that the present invention is, by no means, limited to the particular constructions shown in the drawings, but also comprises any modifications within the scope of the appended claim.

What I claim is:

In combination with a shaft having a first section and a second section with a larger diameter than said first section so as to define therewith a step including a radially extending surface facing in the direction toward said first section: a bearing bushing of rubber elastic material having a bore directly receiving said first section, the surface of said bore being provided with axially extending groove means having the ends thereof spaced in axial direction of said bushing from the end faces of said bushing for receiving and storing a lubricant, two annular grooves respectively arranged near the end faces of said bushing and communicating with said groove means while extending transverse to the axis of said bushing, a first annular sealing strip arranged at one end of said bushing and integral therewith and partially defining the annular groove adjacent to said one end of said bushing, said first sealing strip extending radially inwardly in sealing engagement with said first shaft section, and a second annular sealing strip arranged at and integral with the other end of said bushing and partially defining the annular groove adjacent thereto, said second sealing strip having an extension extending in axial direction of said bushing in sealing engagement with said radially extending surface.

References Cited

UNITED STATES PATENTS

| | | |
|---|---|---|
| 1,775,403 | 9/1930 | McLeod. |
| 1,879,287 | 9/1932 | Johnson 308—238 |
| 2,272,128 | 2/1942 | Osbourne. |
| 2,815,253 | 12/1957 | Spriggs 308—238 |
| 2,980,473 | 4/1961 | Tanis 308—121 |
| 3,043,636 | 7/1962 | MacInnes et al. 308—121 |
| 3,130,991 | 4/1964 | Piragino 308—121 X |
| 3,133,769 | 5/1964 | Drake 308—121 X |

MARTIN P. SCHWADRON, *Primary Examiner.*

DAVID J. WILLIAMOWSKY, *Examiner.*

R. F. HESS, *Assistant Examiner.*